Patented Oct. 16, 1923.

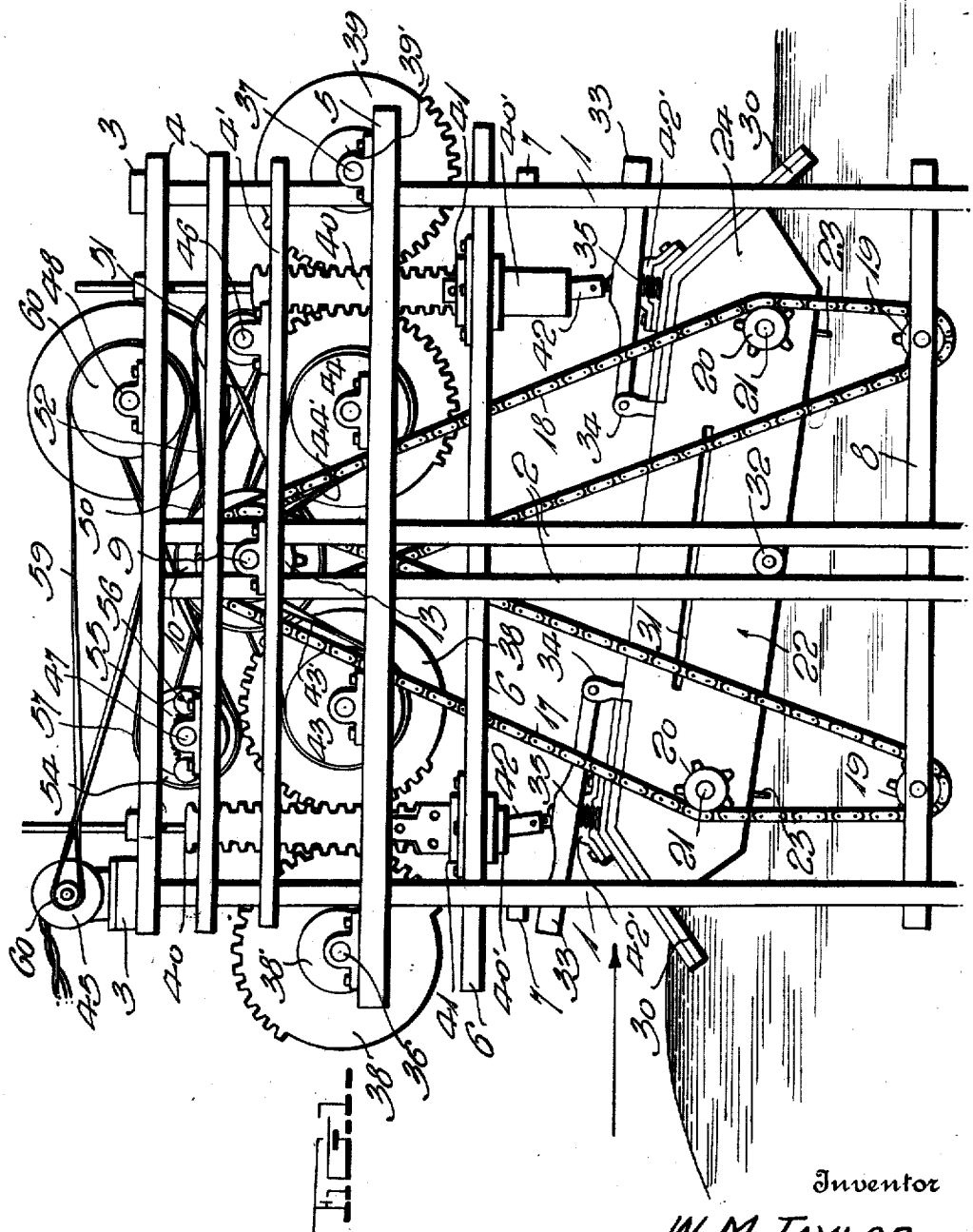

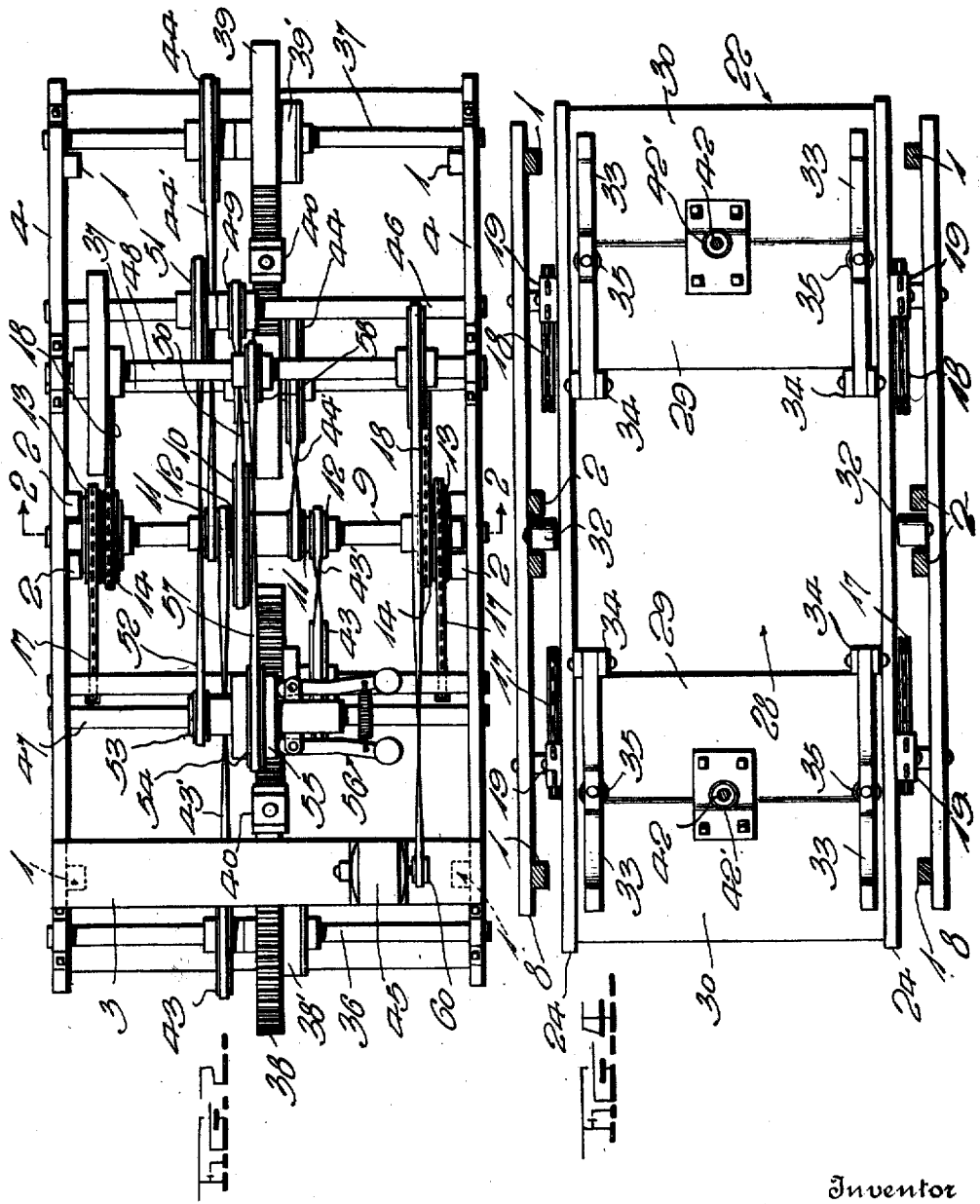

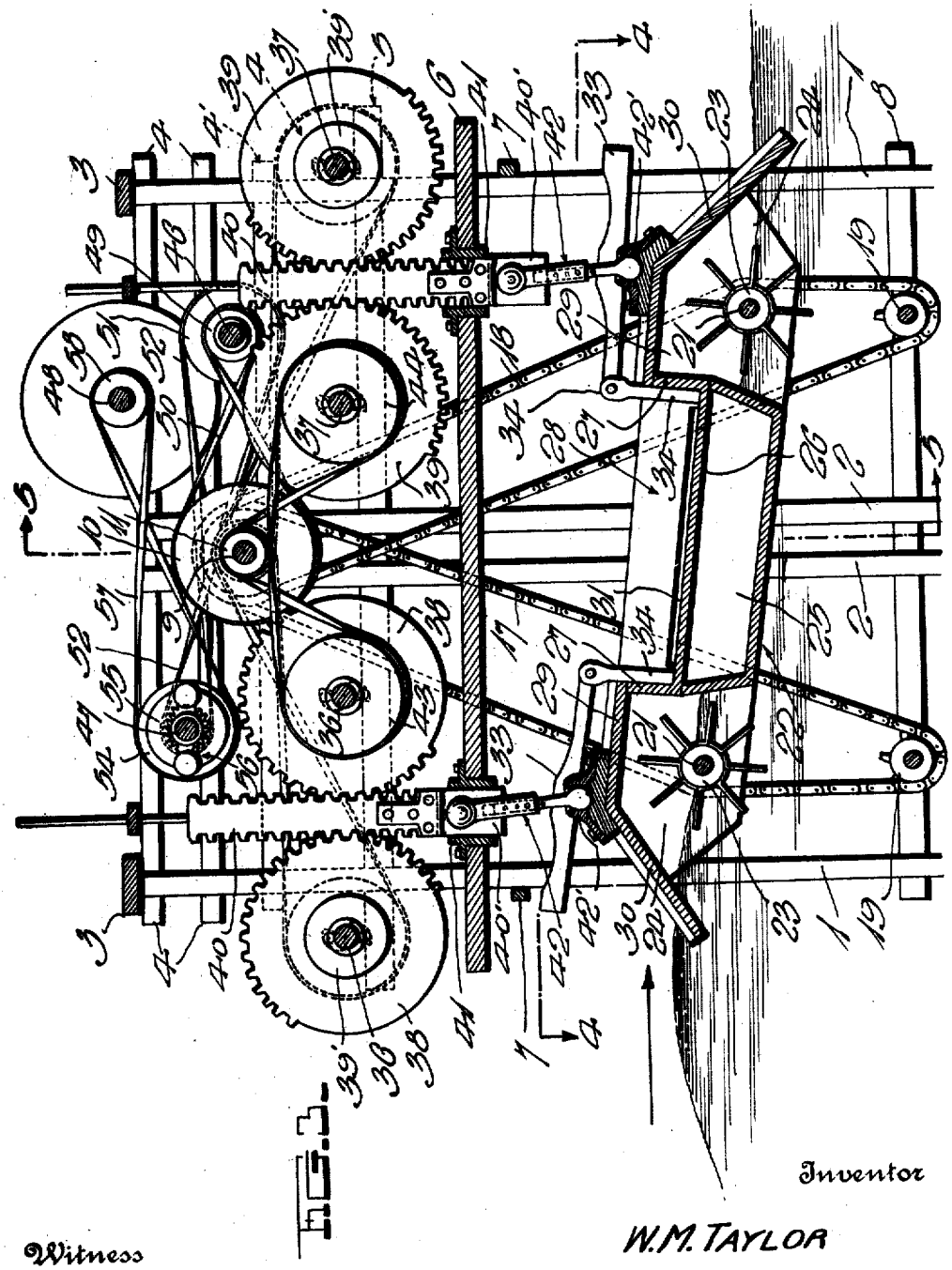

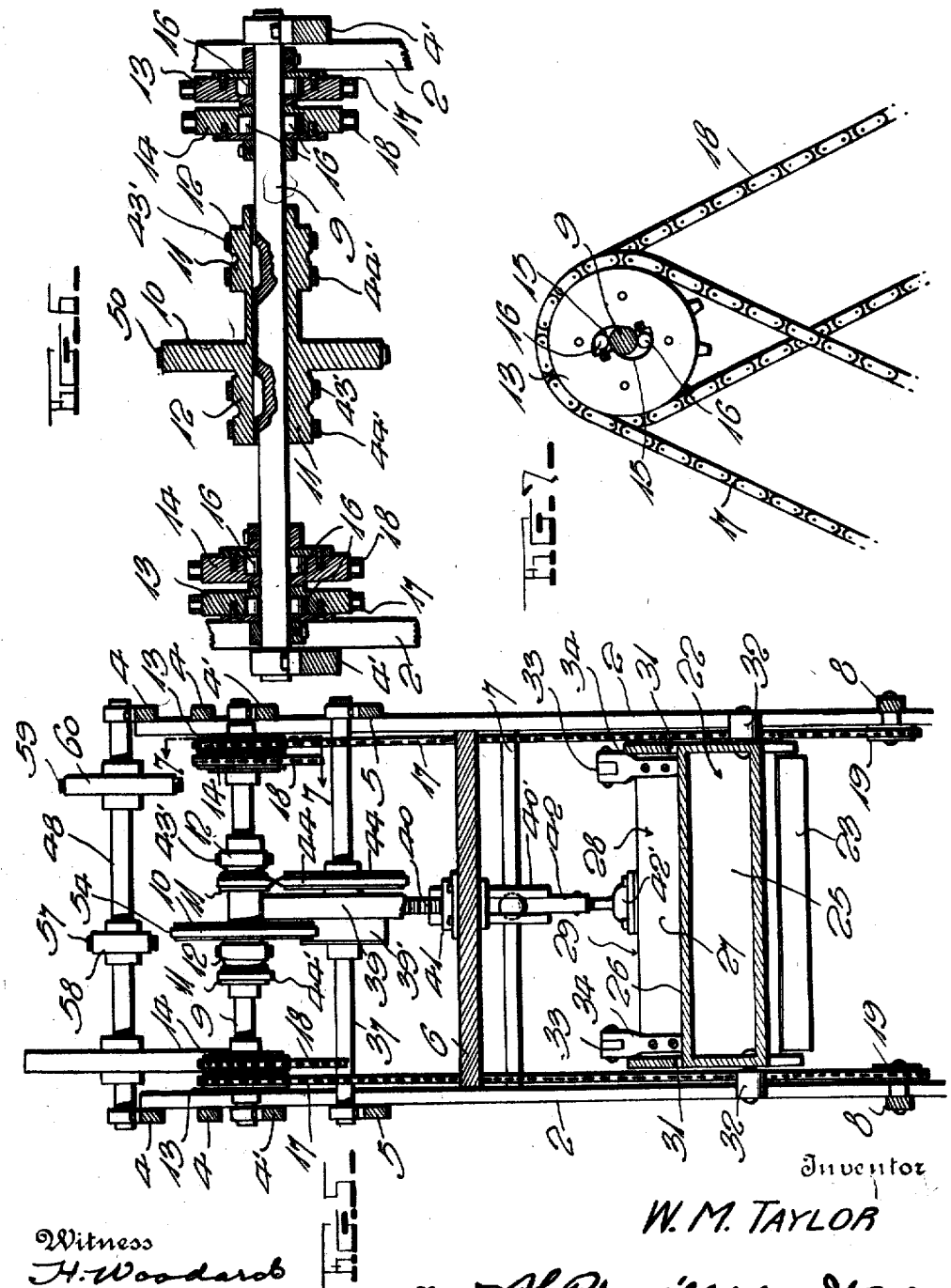

1,471,222

UNITED STATES PATENT OFFICE.

WILLIAM M. TAYLOR, OF MECKLENBURG COUNTY, VIRGINIA.

WAVE MOTOR.

Application filed July 13, 1922. Serial No. 574,847.

*To all whom it may concern:*

Be it known that I, WILLIAM M. TAYLOR, a citizen of the United States, residing in Mecklenburg County and State of Virginia, have invented certain new and useful Improvements in Wave Motors; and I do declare the following to be a full, clear, and exact description of the invention, such as will enable others skilled in the art to which it appertains to make and use the same.

This invention relates to an improved wave motor and one object of the invention is to provide a motor so constructed that as a wave passes under it, it will impart power while rising and also while falling and in addition to so construct this motor that movement of the wave longitudinally of the float will also serve to impart power. Therefore, each wave will have three separate power imparting movements and since each end of the float serves as a driving end, each wave as it passes under the float will serve to cause six driving operations.

Another object of the invention is to provide an improved construction and arrangement of gearing and pulleys connected by belts, the gearing being in the form of pinions engaged by the teeth of racks which are slidably carried by the frame of the motor and connected with the float, so that as the float moves up and down, the pinions will be oscillated and thus step-by-step rotary movement imparted to drive shafts which carry the pinions.

Another object of the invention is to so construct this motor that a master shaft which is rotatably mounted and rotated from the drive shafts may also be rotated by means of sprocket chains which pass over sprocket wheels carried by the master shaft and are engaged by sprocket wheels carried by paddle wheels rotatably mounted at the ends of the float, movement of a wave longitudinally of the float serving to impart rotary movement to the paddle wheels and thus impart movement to the sprocket chains.

Another object of the invention is to so construct the float that it may have vertical movement to compensate for tide and to further so construct the float that during a storm, high waves may cause a well formed in the float to be filled and the float thus caused to sink to a position where it will not be damaged by the high waves.

This invention is illustrated in the accompanying drawings, wherein:

Figure 1 is a view showing the improved wave motor in side elevation.

Figure 2 is a top plan view of the improved wave motor.

Figure 3 is a view showing the wave motor in vertical longitudinal section.

Figure 4 is a transverse sectional view taken along the line 4—4 of Fig. 3.

Figure 5 is a vertical sectional view taken along the line 5—5 of Fig. 3.

Figure 6 is a fragmentary sectional view taken along the line 6—6 of Fig. 2.

Figure 7 is a sectional view taken along the line 7—7 of Fig. 5.

This improved motor will be provided with a framework including the corner posts 1 which will preferably be formed of heavy piling and will be firmly anchored in the ocean bed at a suitable distance from the shore. Intermediate standards or piling may be provided according to the size of the frame. In the present illustration, there has been shown at each side of the frame, spaced standards 2 which serve as guides as will hereinafter be brought out. At the ends of the frame, the standards 1 are connected by bracing bars or cross strips 3 and at the sides, the standards 1 and 2 have their upper end portions connected by longitudinally extending side strips 4 and 4'. Beneath the side strips 4', there has been provided side bars 5 which have their end portions extending beyond the ends of the frame so that mechanism to be hereinafter described may be mounted beyond the ends of the frame. Below the side bars 5, there has been provided a platform 6. Abutment strips 7 extend across the ends of the frame between the corner posts or standards 1 beneath the platform 6 for a purpose to be hereinafter brought out and beneath the water line there has been provided side bars 8 which serve a purpose to be hereinafter brought out. It will of course be understood that the above is only a general outline of essential parts and that in actual construction, the frame may be provided with any number of braces and supports necessary to provide a firm structure.

Within the frame, there has been provided a master shaft 9 which is rotatably mounted in bearings carried by the side bar 4' and carries a relatively large pulley 10, small pulleys 11 and 12 and sprocket wheels 13 and 14. The pulley wheels 10, 11 and 12 are rigid upon the shaft 9 but the sprocket wheels 13 and 14 are loose upon this shaft and have their hub portions provided with tapered pockets 15 in which are mounted clutch rollers 16 adapted to wedge in the pockets 15 and frictionally lock the sprocket wheels upon the shaft when turning in one direction. This construction is illustrated in Figs. 6 and 7 and by referring to Fig. 7, it will be readily seen that when a sprocket wheel is turned in one direction, it will impart rotary movement to the shaft 9 but when not being turned, it will permit the shaft to rotate. Sprocket chains 17 and 18 pass about the sprocket wheels 13 and 14 and are engaged by idler sprockets 19 rotatably connected with the side bars 8 of the frame. These sprocket chains are engaged by driving sprockets 20 carried by the shafts 21 which extend through and are rotatably mounted in the end portions of the float 22 and carry paddle wheels 23. From an inspection of Figs. 1 and 3, it will be readily seen that as a wave moves longitudinally of the float, this will serve to rotate first one paddle wheel and then the other and at sometimes both of the paddle wheels together. As these paddle wheels rotate, the sprocket wheels 20 will serve to impart movement to the sprocket chains 17 and 18 and since the sprocket chains are passed over the sprocket wheels 13 and 14, the shaft 9 will be rotated. In view of the fact that the sprocket wheels 13 and 14 are loose upon the master shaft 9 and provided with clutch means for gripping the master shaft, the sprocket wheels can have independent rotation and while one is standing still or possibly rotating in a reverse direction, others may be rotating to impart rotary movement to the shaft.

The float will be provided with side boards 24 which have their end portions tapered as shown in Figs. 1 and 3. These side boards form side walls for an air chamber 25 which is provided intermediate the length of the float and provided with a top 26 from the end portions of which extend head boards 27 which form ends for a water box 28 provided above the air box 25. The end portions of the float are provided with top boards or platforms 29 which extend from the ends of the water box 28 and terminate in inclined end portions 30 which extend beyond the ends of the side walls 24 and serve as deflectors for normally preventing the waves from striking the paddle wheels above the shafts 21. During a storm, the waves will be larger and the inclined portions 30 of the platforms will permit the waves to ride upwardly over the float and into the water box. The water will pass into the box faster than it can pass out through the slots 31 in the sides and as the box fills with water, the weight of this water will cause the float to be forced downwardly in the water in which it floats. The level of the water in the box is however at all times above the level of the surrounding water and therefore when the waves cease to pass into the box and the water in the box seeks the level of the surrounding water, the float will move upwardly and will gradually return to its original position. It will thus be seen that during a heavy storm the float may be partially submerged and protected from being pounded to pieces by the heavy waves. This float is positioned in the frame as shown and at its side has been provided with rollers 32 which are positioned between the intermediate standards 2 and serve to prevent longitudinal movement of the float and further constitute fulcrums for causing proper rocking of the float as the waves pass beneath it. As the float rocks vertically, the end portions in swinging upwardly might cause damage and therefore there has been provided bumper arms 33 which are pivotally mounted by bearing brackets 34 and yieldably held in a raised position by springs 35. When the end portions of the float swing upwardly, the bumper arms 33 will strike the cross bars 7 and will serve to take up the shock and prevent the end portions of the float from being moved upwardly beyond a desired amount and causing damage.

In order to impart rotary movement to the master shaft from the end portions of the float, there has been provided in the end portions of the frame, shafts 36 and 37 which carry pinions 38 and 39. These pinions 38 and 39 have their teeth engaging rack bars 40. These rack bars 40 are positioned vertically in the frame and pass through guides 41 and have their lower end portions provided with bearing heads 40'. These bearing heads 40' have their lower end portions in the form of sockets to receive the spherical heads of the pitman rods 42 which are formed of separable upper and lower sections and extend downwardly therefrom and have their lower ends provided with spherical heads mounted in the sockets 42 carried by the platforms 29 at the ends of the float. When the float moves up and down, the rack bars are reciprocated and the pinions 38 and 39 caused to rotate, one pinion of each set rotating in one direction and the second pinion rotating in an opposite direction to the first as the rack bars move. These pinions are provided with hub portions 38' and 39' having pockets similar to the pockets 15 and friction clutch rollers similar to the rollers 16 which are provided for the sprocket wheels 13 and 14. It will thus be seen that when the pinions are rotating in one direction, they will turn freely upon the shafts 36 and 37 whereas when they are rotating in an opposite direction, they will serve to impart rotary movement to these shafts. Relatively large pulley wheels 43 and 44 are rigidly mounted upon the shafts 36 and 37 and are engaged by belts 43' and 44' which pass over the pulleys 11 and 12 carried by the master shaft 9. It will thus be seen that as the float is moved by a wave and one end portion is moving upwardly and the other downwardly, the two rack bars will be imparting rotary movement to two of the pinions engaged thereby to rotate two of the shafts which carry these pinions and as the end portions of the float reverse their movement, the second pair of pinions will be rotated to impart rotary movement to the two other shafts. As these shafts 36 and 37 are all connected with pulleys rigid upon the shaft 9 and two of the shafts which carry the pinions are at all times being rotated, rotary movement will be continually imparted to the master shaft 9. Each end portion of the float will therefore serve to impart rotary movement to the master shaft while moving upwardly and will also serve to impart rotary movement to the master shaft when moving downwardly. At the same time, the passage of the water longitudinally under the float will serve to rotate the paddle wheels 23 and these paddle wheels will impart rotary movement to the sprocket chains through the medium of the sprocket wheels 20 and this serves as additional means for imparting rotary movement to the master shaft. Each wave therefore causes three separate driving means for the master shaft 9 to be operated at each end of the float and therefore as each wave passes under the float, it causes rotation of the shaft 9 through the medium of six driving means.

When this motor is in operation, a generator 45 is to be driven at a high rate of speed so that electricity can be generated and since it is desired to have the generator operated at a high rate of speed, there has been provided shafts 46, 47 and 48 which are rotatably mounted in bearings carried by the side bars 4 and 4'. The shaft 46 carries a relatively small pulley wheel 49 which is engaged by a belt 50 passed about the pulley wheel 10 and in addition to the pulley wheel 49, this shaft 46 also carries a larger pulley wheel 51 about which passes a belt 52. This belt 52 passes about a relatively small pulley wheel 53 carried by the shaft 47. A larger pulley wheel 54 is loosely mounted upon this shaft 47 and a clutch 55 controlled by governor means 56 is mounted upon the shaft 47. Under normal conditions, the pulley wheel 54 will turn with the shaft 47 but when the speed of the shaft 47 increases beyond a desired amount and the governor arms swing outwardly, the pulley wheel will be gradually released. Therefore, the shaft 48 will be driven from the shaft 47 by means of a belt 57 which passes around the pulley 54 of the shaft 47 and around a pulley 58 upon the shaft 48. This shaft 48 will therefore be rotating rapidly and rotary movement will be transmitted to the generator 45 and this generator caused to turn very rapidly by means of a belt 59 which passes around a pulley 60 carried by the shaft 48 and passes around a pulley 61 carried by the shaft of the generator 45. It is of course understood that the shafts 46, 47 and 48 and pulleys carried thereby and belts placed about these pulleys are simply means for controlling the speed of rotation of the shaft of the generator with respect to the rotation of the master shaft 9 and therefore any number of these shafts may be provided according to the wishes of the builder. It will also be obvious that the generator 45 need not be mounted upon the frame of this machine but may be mounted at any suitable point desired upon the shore or upon a dock or other support and the drive belt for the generator extended to engage the pulley wheel of its shaft.

When this motor is constructed and set up, the frame is first built at a suitable distance from the shore line to insure proper floating and operation of the float at all times. This frame will be built of a proper size and will be suitably built to provide strength according to its size. The various shafts will be mounted to extend transversely of the frame as shown and the pinions and pulleys will be mounted upon the different shafts and connected by the belts. The rack bars will pass between and engage the teeth of the pinions as shown in Fig. 3 and each will have its lower end connected with a pitman 42. The float will be put in place as shown in this figure and the lower ends of the two pitman shafts 42 will be connected with the bearings 42' carried by the two end portions of the float. The sprocket chains 17 and 18 will be put in place and will engage the sprocket wheels 20 of the paddle wheel shafts so that as a wave moves under the float and imparts rotary movement to the shafts 21, the sprocket chains will be moved and impart rotary movement to the master shaft 9, When the device is operating, the waves pass under the float and as they pass under it, the float is caused to rock with one end moving upwardly and then moving downwardly and the second end moving upwardly while the first is moving downwardly. This causes the rack bars to reciprocate vertically and imparts oscillating movement to the pinions 38 and 39. The shafts 36 and 37 will thus be caused to rotate by a step-by-step rotation and as they rotate in pairs with one pair turning while the other is still, the master shaft will receive continued rotation from the two sets of driven shafts. At the same time that the wave is causing the float to rock, it engages the paddle wheels and causes these wheels to rotate and impart movement to the sprocket chains. Therefore, the master shaft will be rotated by six different means for imparting rotation while a wave passes under the float. When it is desired to make repairs, the upper and lower sections of the pitman rods 42 can be released from each other thus permitting the float to move without imparting movement to the various pinions and shafts of the motor. If desired a number of motors can be erected substantially in alinement and the master shafts connected by universal joints and the coupled motors made use of to operate one or more dynamos. This has not been specifically illustrated as it would be simply duplicating the structure shown.

I claim:

1. A wave motor comprising a frame, a rotatable shaft, a float mounted in said frame, for vertical sliding and pivotal movement, means actuated by said float for imparting rotary movement to said shaft when the float is moved vertically by a wave passing under the float, and other means for imparting rotary movement to said shaft including a paddle wheel having a shaft rotatably carried by said float, a sprocket wheel carried by the shaft of said paddle wheel, and a sprocket chain passing about said sprocket wheel and about a sprocket wheel upon the first mentioned shaft and moved to impart rotary movement to the first shaft when the paddle wheel is rotated by a wave passing beneath said float.

2. A wave motor comprising a frame, a shaft rotatably carried by said frame, a float in said frame moved vertically as a wave passes beneath it, means actuated by vertical movement of said float for imparting rotary movement to said shaft and other means for imparting rotary movement to said shaft including wave actuated driving means carried by said float.

3. A motor including a float and power generating means having actuating means connected with and operated by said float, said float being provided with a pocket open at its upper end and adapted to receive water when waves pass over the float and cause submerging of the float.

4. The structure of claim 3 having the water pocket of the float provided with water outlet means permitting draining of the pocket as the float rises after being submerged.

5. The structure of claim 3 having the end portions of the float being provided with downwardly and outwardly inclined platform portions permitting high waves to pass over the float and fill the water pocket.

6. The structure of claim 2, having said float provided with side walls, an air box between the side walls intermediate the length of the float and a water box above the air box and open at its upper end and platforms carried by said side walls and extending from the ends of said water box, the drive means for the means imparting rotary movement to the shaft consisting of paddle wheels rotatably mounted between the side walls of the float and beneath the platforms, and means for transmitting rotary movement from the paddle wheels to said shaft.

7. A float of the character described comprising side walls, a closed air chamber between said side walls intermediate the length of said float, upstanding walls being provided at the ends of the air chamber between said side walls to provide a water ballast box above said air chamber fillable through its upper end, said side walls being provided with water outlet passages along the bottom of the water box, and platforms for the end portions of said float extending from the ends of the water box.

8. A float of the character described comprising side walls, a closed air chamber between said side walls intermediate the length of said float, upstanding walls being provided at the ends of the air chamber between said side walls to provide a water ballast box above said air chamber fillable through its upper end, said side walls being provided with water outlet passages along the bottom of the water box, and platforms for the end portions of said float extending from the ends of the water box, shafts journaled in said side walls and extending beneath said platforms, paddle wheels carried by said shafts between said side walls, and motion transmitting means carried by said shafts.

9. In a wave motor, a frame, a driven shaft rotatably carried by said frame, drive shafts rotatably carried by said frame in spaced relation, pinions loose upon said drive shafts and having clutch means for gripping the drive shafts and turning the same when the pinions turn in an operative direction, means for transmitting rotary movement from said drive shafts to said driven shafts, a reciprocating rack bar extending between and engaging said pinions to oscillate the pinions as the rack bar reciprocates, a float, a pitman connecting the float with said rack bar, a sprocket wheel loose upon said driven shaft and having clutch means locking the sprocket wheel when turned in an operative direction, an idler sprocket carried by said frame, a sprocket chain engaged with said sprocket wheels, a paddle wheel having its shaft journaled in said float, and a sprocket wheel carried by the paddle wheel shaft and engaging said sprocket chain to impart movement to the same when the paddle wheel is rotated by a wave passing beneath the float.

In testimony whereof I have hereunto affixed by signature.

WILLIAM M. TAYLOR.